Dec. 17, 1968  S. H. UPDIKE  3,416,771
UNITIZED VALVE STEM RETAINER LOCK
Filed Dec. 3, 1965  3 Sheets-Sheet 3
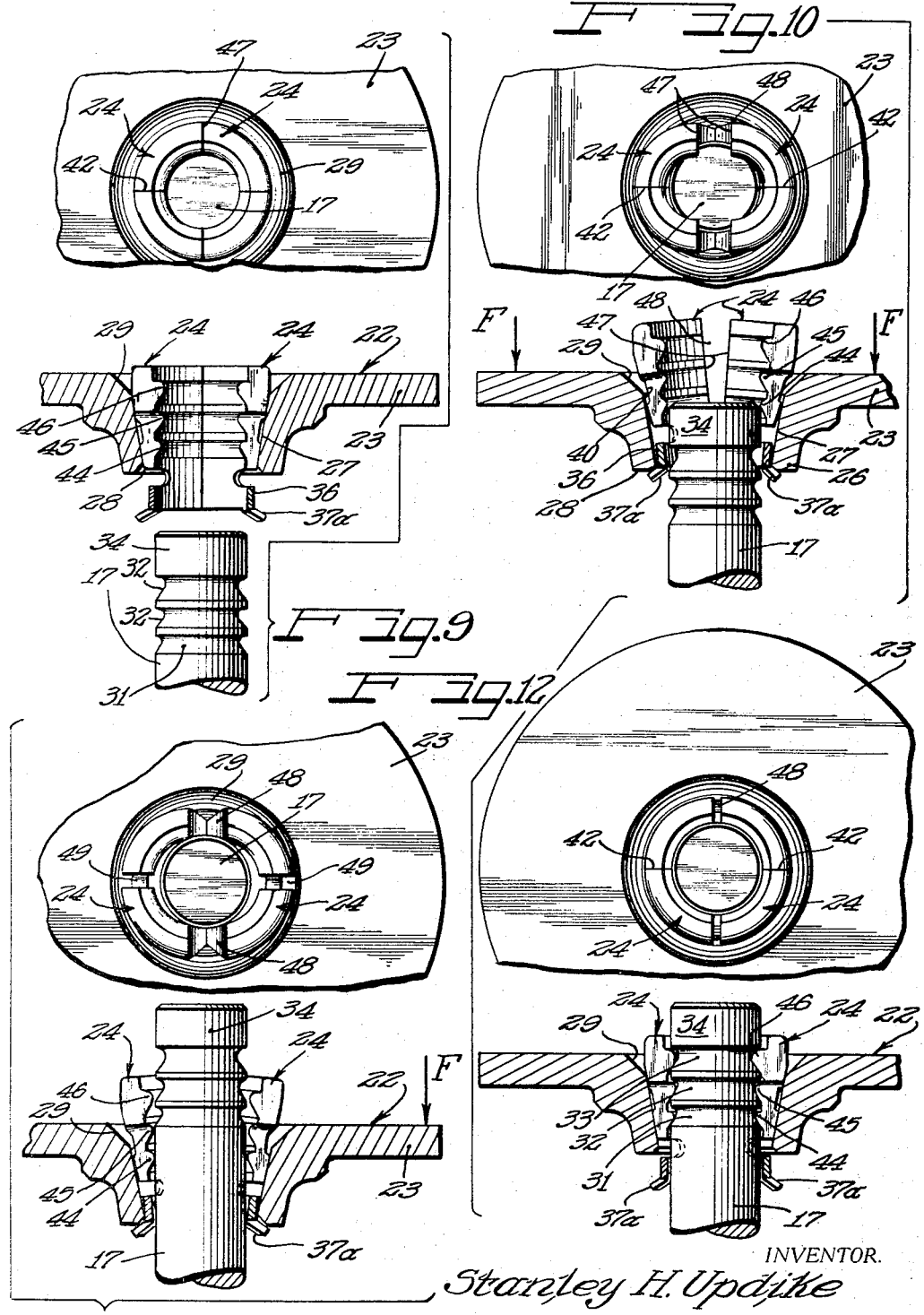
INVENTOR.
Stanley H. Updike
ATTORNEYS ated Dec. 17, 1968

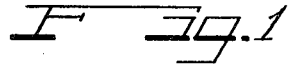 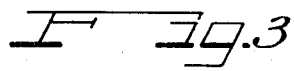 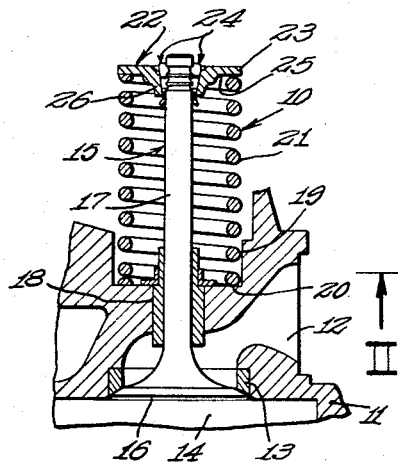 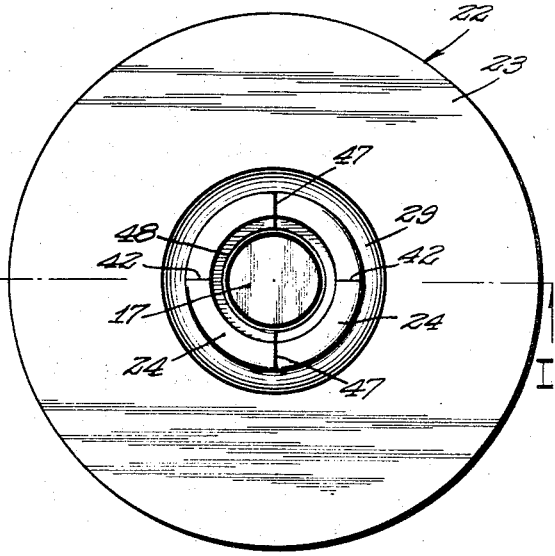 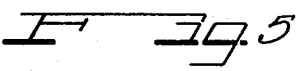 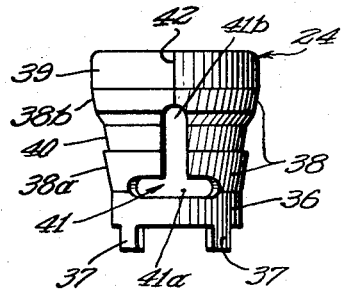 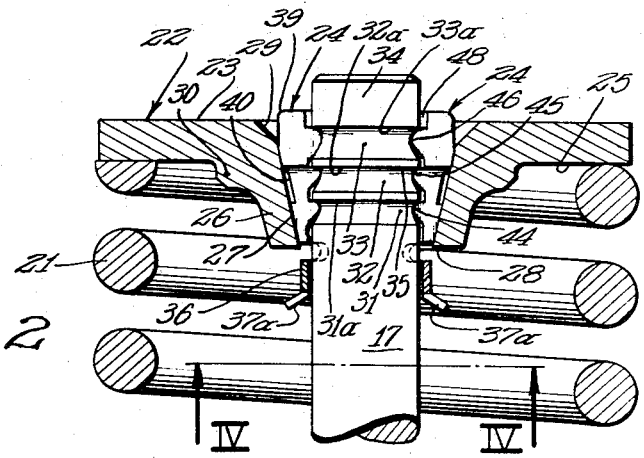 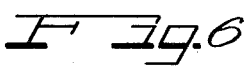 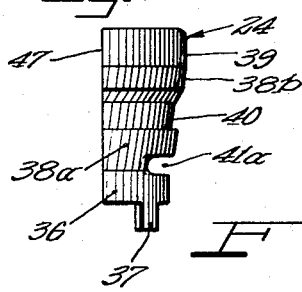 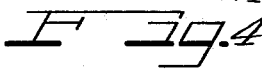 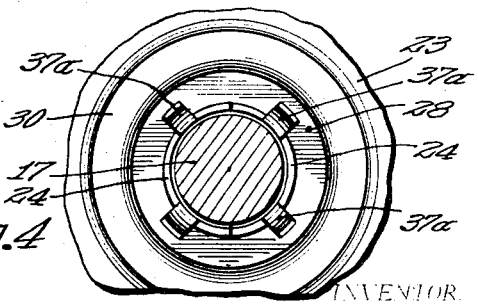

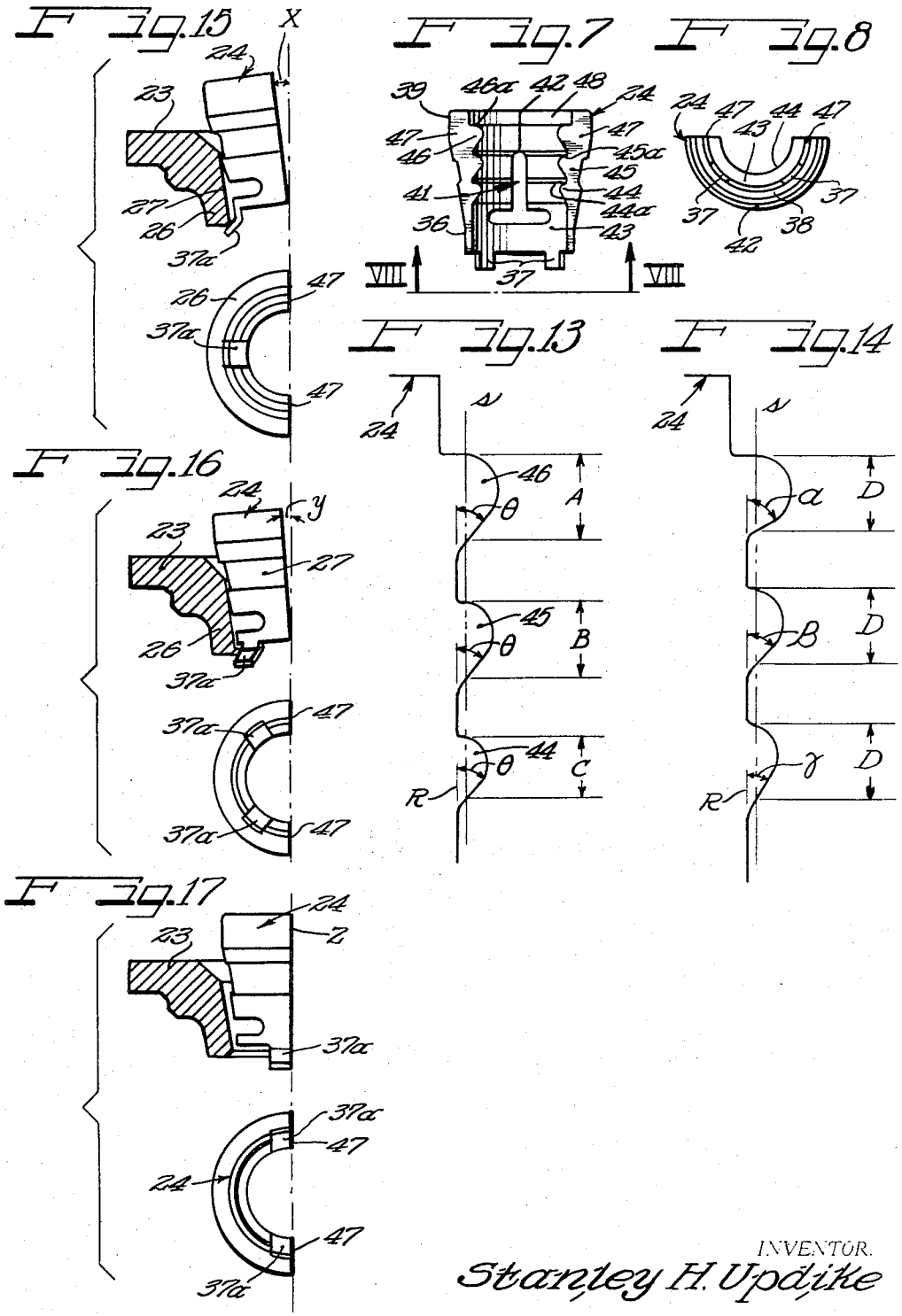

3,416,771
UNITIZED VALVE STEM RETAINER LOCK
Stanley H. Updike, Mentor, Ohio, assignor to TRW Inc.,
Cleveland, Ohio, a corporation of Ohio
Filed Dec. 3, 1965, Ser. No. 511,556
5 Claims. (Cl. 251—337)

ABSTRACT OF THE DISCLOSURE

A unitized valve spring retainer and lock assembly having self-opening and closing lock segments with tapered outer walls engaging the tapered bore of the retainer to butt the segments together and provide a cylindrical passageway therethrough freely receiving the stem of a valve to accommodate rotation of the valve relative to the assembly. The segments have axially spaced inwardly projecting beads or ribs increasing in radial height successively from the bottoms to the tops of the segments for seating valve stem grooves to lock the valve stem against axial movement. The lock segments have a circumferential groove intermediate the ends thereof to accommodate wide angle tilting of the segments in the retainer for facilitating insertion of a valve stem.

According to this invention, the conventional lock segments for valve spring retainers are replaced with a unitized retainer and lock assembly which can be snapped onto the valve stem. A feature of the invention is the accommodation of valve rotation relative to the retainer and spring. The locks preferably take the form of two mated semi-cylindrical or semi-cylindroidal collars with an axially tapered outer wall and a multiple ribbed or beaded cylindrical inner wall. Each segment has a median T-slot and is split at its large diameter end from the upstanding leg of the slot. The lock segments, when mated together, provide a cylindrical or cylindroidal bore of larger diameter than the valve stem to be received therein. The ribs or beads provide annular shoulders projecting into this bore in greater amounts from the bottom to the top thereof. Three successive annular shoulders are preferably provided. The bottoms of the beads or ribs are inclined upwardly to guide the valve stem into the bore while at the same time separating the segments. The segments project through the conical bore of a conventional valve spring retainer and are wedged into abutted relation by this bore. The small or bottom ends of the segments have one or more lugs depending therefrom which are bent outwardly after the segments are inserted at equal depths into the bore of the retainer for providing tangs or ears which will prevent removal of the segments from the retainer. The assembly of segments and retainer receives the multiple grooved end of a valve stem by merely inserting the stem through the small end of the mated together segments. This causes the segments to rock in the retainer about the pivot points provided by the outturned tangs, and the assembly is thus snapped onto the valve stem. When the spring load is applied to the retainer to move it to the end of the inserted valve stem, the conical bore of the retainer will wedge the segments into tight mated engagement, but since the bore of the mated together segments is of larger diameter than the valve stem, the valve stem is only engaged by the beads or ribs and is free to rotate relative to the retainer.

It is, then, an object of this invention to provide a retainer and lock assembly as a unit that is easily snapped onto a shaft or stem.

A further object of this invention is to provide a spring retainer and stem lock assembly as a unit which can be mounted on a valve stem or the like by automated machinery.

A still further object of this invention is to provide a valve spring retainer with a plurality of stem lock segments which are adapted to rock in the bore of the retainer to a position for receiving the valve stem and are then wedge locked by the bore to form a tube completely enveloping the valve stem with inwardly projecting rib means axially retaining the stem in the bore while accommodating rotation of the stem.

Another specific object of the invention is to provide a unitized retainer and multiple lock segment assembly wherein the lock segments are tiltable in the retainer to accept a valve stem and are then wedge locked by the retainer into complete valve stem embracing relation.

Another object of the invention is to provide a tapered bead arrangement in a valve stem lock providing maximum bead shear area with minimum axial lock movement during installation.

Other and further objects of this invention will be apparent to those skilled in this art from the following detailed description of the annexed sheets of drawings which, by way of preferred examples, illustrate several embodiments of the invention.

On the drawings:

FIGURE 1 is a fragmentary longitudinal cross-sectional view, with parts in elevation, of an engine poppet valve assembly equipped with a unitized valve stem retainer and lock of this invention;

FIGURE 2 is an enlarged fragmentary cross-sectional view, with a part in elevation, of the valve tip end of the assembly of FIGURE 1, illustrating the retainer and stem lock in more detail.

FIGURE 3 is a top plan view of the assembly of FIGURE 2;

FIGURE 4 is a cross-sectional view, with parts in elevation, along the line IV—IV of FIGURE 2;

FIGURE 5 is a back elevational view of one of the lock segments of this invention;

FIGURE 6 is a side elevational view of the lock segment of FIGURE 5;

FIGURE 7 is a front or inside elevational view of the segments of FIGURES 5 and 6;

FIGURE 8 is a bottom plan view of the segment of FIGURES 5–7, taken along the lines VIII—VIII of FIGURE 7;

FIGURES 9 through 12 are longitudinal sectional and corresponding top plan views of the unitized retainer and lock assembly of this invention, illustrating the manner in which it is applied to a valve stem and showing the relative positions of the parts, both in cross-section and in plan, at various stages during the mounting on the valve stem;

FIGURE 13 is an enlarged diagrammatic view illustrating the bead configuration of one embodiment of stem lock according to this invention;

FIGURE 14 is a view similar to FIGURE 13, but illustrating another bead configuration for the locks of this invention; and FIGURES 15 through 17 are elevational and bottom plan views of stem locks of this invention, illustrating various positions for the retainer tabs or ears and the manner in which these positions affect the rocking or tilting of the lock in the retainer during mounting on a valve stem.

As shown on the drawings:

In FIGURE 1, the reference numeral 10 designates generally an engine poppet valve assembly in operating position in an internal combustion engine. As therein shown, the cylinder head 11 has a port 12 with a valve seat ring 13 at the mouth thereof and communicating with the combustion chamber 14 of the engine under the control of the engine poppet valve 15 which has a head 16 coacting with the seat ring 13 and a stem 17 slidably mounted in a stem guide 18 carried by the head. The head provides a well 19 with a bottom wall 20 surrounding the stem guide 18. The spring 21, for urging the valve to the closed position on the seat 13, as shown, has the bottom end thereof seated on the bottom wall 20 of the well 19 and the top end thereof retained by the unitized retainer and stem lock 22 of this invention. This unitized assembly 22 is composed of a spring retainer 23 and a pair of lock segments 24 carried in the retainer. The retainer 23 is in the form of a disk with a flat radial shoulder 25 receiving the top end coil of the valve spring 21 and a depending cylindrical collar portion 26 inwardly of the shoulder 25, defining a conical bore 27 diverging upwardly from a small bottom end 28 to an outwardly beveled mouth 29 at the top of the disk. A raised pilot portion 30 is provided between the radial shoulder 25 and the collar 26 on the bottom face of the disk to project into the end coil of the spring 21, thereby centering the spring concentrically in spaced relation around the valve stem 17.

As shown in FIGURE 2, the tip end of the valve stem 17 has three axially spaced peripheral grooves 31, 32 and 33, each sloping inwardly and upwardly to a maximum depth and then abruptly turning outwardly to the full stem diameter for providing retaining shoulders 31a, 32a and 33a, respectively. The top shoulder 33a is spaced inwardly from the tip end 34 of the valve stem, sufficiently to provide a strong land area behind the top shoulder 33a and the grooves are spaced apart sufficiently to provide strong land areas 35 between the grooves so that the shoulders 31a and 32a will be rigidly backed. The grooves 31, 32 and 33 can be of the same depth or of successively increasing depth toward the tip end 34 of the valve stem.

As shown in FIGURES 5-8, each lock segment 24 is composed of a generally semi-tubular metal body with a generally semi-cylindrical bottom end portion 36 from which depend a pair of circumferentially spaced lugs or tangs 37. The portion 36 extends upwardly to a semi-conical portion 38 which diverges outwardly to a top semi-cylindrical portion 39. A peripheral groove 40 is formed in the tapered portion 38, dividing the same into a bottom tapered portion 38a and a top tapered portion 38b. A T-slot 41 is cut centrally through the body with a horizontal or circumferential head 41a at the small end of the tapered portion 38, and a vertical leg 41b extending to the large end of the tapered portion. The tubular segment is split at its upper end with the line of split 42 extending from the leg 41b to the top of the segment.

The inner wall 43 of the lock segment 24 is semi-cylindrical and of uniform diameter from the bottom to the top thereof, thus providing a generally cylindrical or cylindroidal bore when a pair of the segments are mated together. The wall 43 has three spaced superimposed beads or ribs 44, 45 and 46 which project inwardly therefrom and extend transversely around the wall. These ribs may be of the same or successively increasing radial depths and have tapered configurations to fit in the grooves 31, 32 and 33 of the valve stem 17 with each rib having a top shoulder 44a, 45a and 46a, respectively, to engage the shoulders of the stem grooves.

The segment 24 has generally radial end edges 47 along the length thereof for engaging the similar edges of the mating segments and when the edges are abutted together, the pair of segments form a generally complete tube receiving the valve stem therethrough. The inner wall 43 of this tube is spaced radially outward from the valve stem, but the shoulders of the ribs projecting from this inner wall lock the stem axially while accommodating free rotation of the stem in the lock.

The tapered wall portions 38a and 38b of the segments mate with the tapered bore 27 of the retainer to be wedge-locked therein for holding the segments in abutted relationship. Since the inner wall 43 of each segment 24 is semi-cylindrical or semi-cylindroidal and since the outer wall portion 38 of each segment diverges from the small semi-cylindrical end portion 36 to the large cylindrical end portion 39, the segments increase in thickness along the length of the tapered portion 38 and are thickest at the divergent end of this tapered portion. The thick top end portion of each segment is preferably counterbored at 48, as shown in FIGURE 2, to prevent gripping of the valve stem and to insure a full mating together of a pair of segments.

To form the unitized assembly 22, a pair of segments 24 is dropped into the large beveled end 29 of the retainer 23. The small cylindrical ends 36 of the segments 24 project beyond the small end 28 of the bore 27 and the bore draws the two segments together with the respective end edges 47 in engagement. Care is used to insure that the two segments are at the same level in the bore with the ribs or beads aligned to provide complete annular shoulders. The lugs or tangs 37 are then bent outwardly to form inclined retainer ears 37a which cannot enter the bore 27 and which provide rocking fulcrums on the end 28 of the retainer collar 26. The segments are thus held in the retainer bore, but can shift axially and tilt apart.

The unitized assembly 22 is easily applied to the valve stem 17 as illustrated in FIGURES 9-12. As shown in FIGURE 9, the assembly 22 is positioned horizontally above the tip end of the valve stem 17, and in this position, the segments 24 drop by gravity to project beyond the small end of the bore 27, with the bore holding the segments in abutted mated relation. The cylindrical portions 36 of the segments and the outturned ears 37a are below the small end mouth of the bore. The tubular bore, defined by the mated together segments 24, is large enough to receive the tip end of the stem, and the assembly 22 slips over this tip end of the stem up to the level of the bottom beads 44. As the inclined bottom walls of these beads 44 engage the tip end of the stem, their downward movement is arrested and further downward force F on the retainer 23, as shown in FIGURE 10, will move the retainer downwardly relative to the segments 24 until the bottom end of the retainer collar 26 engages the ears 37a, whereupon the inclined bottom faces of the beads 44 will ride over the tip end of the stem 17, causing the segments 24 to rock apart until the bore 27 engages the smaller tapered ends of the segments and freely receives the cylindrical portions 36 thereof. At this depressed level of the retainer 23 relative to the segments 24, the grooves 40 of the segments are aligned with the tapered mouth 29 of the bore to accommodate increased tilting of the segments. Gaps 48 are thus opened up between the previously mated end edges 47 of the segments and these gaps diverge toward the top ends of the segments. It will be noted from FIGURE 9 that when the segments 24 are tilted apart by the bottom beads 44 riding over the tip end of the valve stem 17, the top rows of beads or ribs 45 and 46 are tilted outwardly from the stem a sufficient distance to receive the stem therebetween in the plane shown in FIGURE 10, even though the splits 42 of the segments are unopened. However, as illustrated in FIGURE 11, as the assembly 22 is forced down further on the valve stem 17, the stem also spreads the segments at right angles to the previously opened up gaps 48 and the splits 42 are opened to form gaps 49. This spreading is made possible by the T-slots 41 and the split ends 47 of the segments and is accommodated by the grooves 40 being aligned with the beveled mouth 29. The fully opened up segments are illustrated in FIGURE 11 with the valve stem 17 projecting beyond the segments. The unitized assembly is thus applied to the valve stem beyond its operating position. When the assembly 22 has reached the position of FIGURE 11, the force F is released from the retainer 23, whereupon the spring load on the retainer will move it upwardly toward the tip end of the stem and approach the operating position shown in FIGURE 12. As there shown, the segments have not yet reached their fully mated together position, but the gaps 49 have been closed and the gaps 48 are diminished. The position of FIGURE 12 illustrates the relative positions of the parts just before the beads of the segments engage the shoulders of the grooves of the stem. To show how the snapping shut of the gaps 49 occurs before the complete closing of the gaps 48, the bead 44 fits freely in the groove 31, the bead 45 fits freely in the groove 32, and the bead 46 fits freely in the groove 33. Then, as the spring load 21 on the retainer 23 forces the retainer to its uppermost position, as shown in FIGURE 2, the shoulders 44a, 45a and 46a of these beads will engage the shoulders 31a, 32a and 33a of the grooves. The retainer is thus locked on the valve stem.

The beads 44, 45 and 46 preferably have successively increasing radial heights and the receiving grooves of the valve stem 17 conform with these beads, thereby providing a safety feature since the locks cannot engage the improper size stem groove. Further, the varying bead height permits installation of the assembly with minimum axial movement because the lock segments pivot about the ears or tabs 37a and the top bead 46 moves radially a greater amount than the lower beads, thus permitting a larger bead size than could otherwise be installed. The form of the beads provides a taper to slide easily over the stem grooves.

As shown in FIGURE 13, the taper of the beads may be varied to distribute shear stress along the line $s$ which is outwardly from the root diameter R of the bead and represents the center of shear force. As shown in FIGURE 13, all of the beads have an equal taper angle theta which provides unequal shear areas A, B and C. As shown in FIGURE 14, when the taper angles are varied, as shown at alpha, beta and gamma, the bead stress is redistributed and the equal shear areas D are provided for each bead. FIGURES 13 and 14 thus illustrate how the shear stress along bead shear line $s$ can be distributed equally or in proportion to the relative load carrying requirements of individual beads. The changing of the bead taper angles redistributes the bead stress without changing radial displacement necessary to install the locks. In FIGURE 13, the sum of the unequal shear areas, A, B and C, is equal to the sum of the equal shear areas D of FIGURE 14.

As shown in FIGURES 15–17, the degree of radial flexing required of the lock segments may be controlled by locating the tabs or ears 37a at different positions. In FIGURE 15, the single tab 37a is located midway between the end edges 47 of the lock 24 and as it engages the collar 26 of the retainer 23, it will accommodate maximum tilting of the segment 24 in the bore 27 of the retainer 23. This tilting is illustrated by the angle X from the center line. The angle X is somewhat decreased to Y, as shown in FIGURE 16, when the tabs or ears 37a are positioned as shown, midway between the tab of FIGURE 15 and the end edges 47. The angle is reduced to zero, as shown at Z in FIGURE 17, when the ears 37a are positioned at the end edges 47. Thus, the assembly can be made with minimum axial movement on the valve stem when a single rocking ear 37a is provided in the position of FIGURE 15, while maximum axial movement is required when the rocking ears 37a are positioned as shown in FIGURE 17.

I claim as my invention:

1. A unitized valve spring retainer and lock assembly permitting free valve rotation and suited for automated installation on a valve stem with axially spaced grooves of different sizes which comprises a valve spring retainer having a converging bore therethrough, a plurality of valve stem segments retained in said bore for relative axial and tilting movements therewith, said bore wedging said segments into butting engagement, said butted together segments defining a bore therethrough adapted to receive a valve stem with axially spaced grooves of different sizes, and a plurality of axially spaced bead means having different sizes for fitting in complementary valve stem grooves on said segments projecting into said bore for seating in said valve stem grooves to lock the stem against axial movement while accommodating rotation of the stem in the segments.

2. A unitized retainer for a stem having axially spaced grooves of different depths which comprises a member having a conical bore therethrough, a plurality of fragmental cylindroidal lock segments retained in said bore in relative axial and tilting relation therewith, said segments having mating edges butted together by the tapered bore and when butted together defining a stem receiving bore therethrough, said segments having axially spaced internal bead means of different radial height adapted to engage in complementary grooves of an inserted stem with said axially spaced grooves of different depths to hold the stem against axial movement relative to said member while accommodating rotation of the stem, and means on each of said segments adapted to engage the member to provide fulcrums for the segments in the bore accommodating spreading apart of the segments to receive the stem.

3. A valve stem lock which comprises a semicylindroidal collar having a tapered outer periphery and three axially spaced internal beads increasing in radial height from the small to the large end of the collar.

4. A valve stem retainer and lock assembly for a valve stem having a plurality of axially spaced circumferential grooves at the tip end thereof successively increasing in depth toward the tip end which comprises a valve stem retainer with an upstanding collar having a tapered bore therethrough converging to the end of the collar, a counter bore at the large end of said tapered bore, an annular shoulder on said retainer surrounding said collar, a pair of mated semi-cylindroidal lock segments axially shiftable and tiltable in said tapered bore of the retainer, said segments having tapered outer walls mating with said tapered bore and providing a large end and a small end for each segment, said tapered outer walls each having a circumferential groove dividing the walls into top and bottom portions, said grooves adapted to receive therein the mouth between the tapered bore and counter bore of the retainer to accommodate additional tilting of the segments in the retainer, each of said segments being split at the large end thereof to accommodate additional spreading of the segments, said segments being wedged together by said tapered bore into butted relation for defining a stem receiving bore therethrough, each of said segments having a plurality of axially spaced beads projecting into said stem receiving bore, said axially spaced beads successively increasing in height from the small end of the segment, said beads having tapered bottoms and top shoulders for respectively guiding a valve stem to tilt the segments to an open position in the tapered bore of the retainer with the grooves of the segments receiving the mouth between the tapered bore and counter bore and for engaging with complementary valve stem grooves to retain the stem against axial movement in the retainer, and outturned means on the small ends of the segments engaging the retainer to prevent removal of the segments from the tapered bore.

5. A valve stem lock which comprises a pair of segmental cylindroidal tubes adapted to be butted together to form a stem receiving bore, said tubes having tapered outer walls diverging to the tops of the tubes and adapted to be wedge locked in the tapered bore of a retainer, a plurality of axially spaced beads in said tubes projecting inwardly into said bore to retain a valve stem therein, said beads increasing in radial height successively from the bottoms to the tops of the tubes, and each of said beads having a tapered bottom wall accommodating insertion of the valve stem and a substantially radial top wall to lock the valve stem.

References Cited

UNITED STATES PATENTS

| | | | |
|---|---|---|---|
| 1,390,661 | 9/1921 | Willard | 251—337 |
| 1,393,348 | 10/1921 | Davenport | 251—337 |
| 1,761,925 | 6/1930 | Lampman | 251—337 |
| 2,789,458 | 4/1957 | Skeisvoll | 85—33 |
| 2,827,031 | 3/1958 | Newton | 123—188 |
| 3,273,856 | 9/1966 | Tauschek | 251—337 |
| 3,338,228 | 8/1967 | Giles | 123—188 |

HENRY T. KLINKSIEK, *Primary Examiner.*

U.S. Cl. X.R.

123—90; 287—20.3; 85—8.6